R. H. BROWNLEE.
PROCESS OF MANUFACTURING LUBRICATING OILS AND PRODUCTS THEREOF.
APPLICATION FILED MAY 13, 1918.
1,309,432.
Patented July 8, 1919.
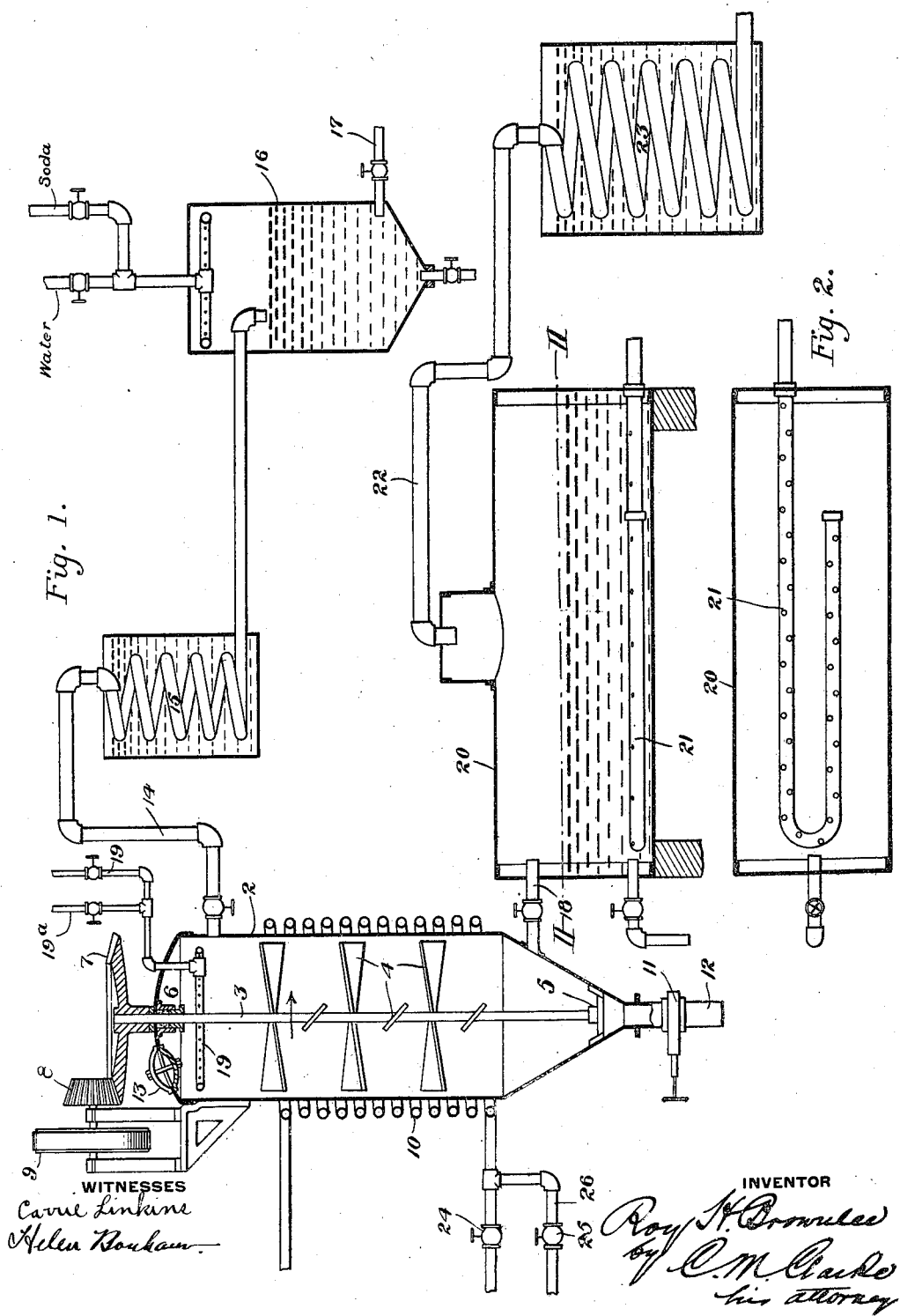

UNITED STATES PATENT OFFICE.

ROY H. BROWNLEE, OF PITTSBURGH, PENNSYLVANIA.

PROCESS OF MANUFACTURING LUBRICATING-OILS AND PRODUCTS THEREOF.

1,309,432.   Specification of Letters Patent.   Patented July 8, 1919.

Application filed May 13, 1918. Serial No. 234,077.

*To all whom it may concern:*

Be it known that I, ROY H. BROWNLEE, citizen of the United States, residing at Pittsburgh, in the county of Allegheny and State of Pennsylvania, have invented certain new and useful Improvements in Processes of Manufacturing Lubricating-Oils and Products Thereof, of which the following is a specification.

My invention relates to an improved process of manufacturing lubricating oils of low specific gravity, low cold test and high viscosity, and to oil products resulting from such process, having the properties of lubricating oils made from the finest asphaltic base crudes, from hydrocarbons of petroleum distillates.

In carrying out my process I may utilize any suitable hydrocarbon made from the lighter vaporized and condensed products of hydrocarbon oils, but prefer the product of the process of treating hydrocarbon oils forming the subject matter of my prior application filed March 29, 1917, Serial No. 158,165.

Generally stated, the present improvement consists in treating a petroleum distillate containing a considerable percentage of unsaturated hydrocarbons within an inclosed vessel in the presence of a suitable catalyst, capable of polymerizing the unsaturated hydrocarbons at a suitable temperature with accompanying agitation, to effect the desired reaction and separation of useful vapors from other undesirable products. Thereafter the agitation is temporarily discontinued, the accumulated sludge is drawn off, and a small portion of the lighter vapors may be distilled off and condensed and washed and collected for use as a fuel or otherwise. The remaining product is then agitated and washed with water from any suitable supply, as a spray pipe, and allowed to settle, and is then washed with an alkaline material, from a suitable supply. The alkaline material is then removed, and the remaining product is washed with water to remove any remaining alkaline material. The remaining material is then reduced in the presence of steam or a suitable gas to produce the desired resulting lubricating oil above referred to.

In the accompanying drawings, I have illustrated an apparatus suitable for the process, in which:

Figure 1 is a diagrammatic representation in sectional elevation, adapted to operate in the manner hereinafter set forth.

Fig. 2 is a longitudinal sectional view of the still, on the line II, II of Fig. 1.

I provide a cylindrical vessel 2 of suitable dimensions and capacity, in the center of which is a rotatable shaft 3 having a series of agitating paddles or beaters 4. Shaft 3 is supported in a step box 5 having surrounding clearance for circulation and passes upwardly through a stuffing box 6 and a top bearing, and is rotated by gearing 7—8 and pulley 9, or other suitable means of vigorous agitation may be used. The vessel 2 is surrounded by a hot water or steam heating coil 10 by which the contents may be raised to any desired temperature under control of the operator, and a valve 11 and conduit 12 provide for withdrawal of accumulated contents from the bottom of the vessel.

Petroleum distillate of proper quality and containing a considerable percentage of unsaturated hydrocarbon, is first treated with sulfuric acid in the usual manner to remove any objectionable matter, and is then charged into vessel 2 through a man hole 13.

To this main body of petroleum distillate I add a catalyst capable of polymerizing the unsaturated hydrocarbons present, as say about one tenth of a pound, or less, of anhydrous aluminum chlorid or anhydrous hydrochloric acid or other halid per gallon of distillate, or means for producing the same in a nascent condition. The catalyst may be introduced through man-hole 13, or through pipe 19. The vessel is then closed and the stirring paddles are actuated, operating to agitate the liquid upwardly, and the temperature is raised to a suitable degree, as from 300° to 400° F. However, the desired reaction will take place to some extent at ordinary temperatures, but slowly and incompletely, compared to the higher temperatures noted.

After stirring, for say an hour to an hour and one half, the stirring is stopped, and a heavy dark colored sludge, resulting from the operations, is allowed to settle into the bottom of vessel 2 and is drawn off through valve 11.

Any light naphtha vapor in the vessel, *i. e.* saturated hydrocarbons not exceeding say 5% to 10% of the total charge, may be drawn off through valve-controlled conduit 14 to condensing coil 15 and is condensed to a liquid. This product has an acid reaction and may be easily neutralized with soda. It is passed through a washer 16 to remove excess of soda and then drawn off by outlet 17 and used as a fuel for engines, or as desired.

Such separate treatment of any portion of the main charge may however be omitted, and included in the general operation following.

The contents of agitating vessel 2 are cooled and again stirred, or otherwise agitated, and are then allowed to stand, when coloring substances will settle to the bottom of the agitator and be drawn off. Cooling of the contents of vessel 2 may be effected by shutting off the steam or hot water supply to the coil 10 by valve 24 and opening valve 25 of a branch cold water supply pipe 26. Soda or caustic soda solution is added by branch pipe 19ª. The contents of agitating vessel 2 are again stirred and allowed to settle to the bottom. Excess of alkaline material is washed out with water from spray pipe 19 and is drawn off from the bottom of agitator.

At this stage in the process, the remaining product will have become clear and of a light amber color, and is drawn off through valve-controlled conduit 18 to still 20.

Still 20, into which the washed product is charged, is suitably mounted for operation over a furnace setting of common construction, and in which it is reduced by heat action, in connection with steam or a suitable gas, introduced in the bottom of the still by pipe coil 21 having outlet perforations, of well known construction.

At first a certain proportion of naphtha vapor is produced which passes by conduit 22 to condenser 23, and is drawn off and treated as above described to produce a liquid condensate. If all of the distillates from still 20 having a flash point higher than about 300° F. are mixed together, an excellent light lubricating oil is obtained, of low viscosity. If desired, also, the product may be divided as taken off, into separate fractional quantities of lubricating distillates, thereby obtaining a number of oils having different gravities and viscosities.

The distillate from this oil has a remarkably low cold test, —60° to —70° F., and will remain perfectly bright below those temperatures.

The oil remaining in the still will now have been reduced to the desired flash and viscosity and, if desired, may be filtered through any suitable medium, as clay, bone, etc., to remove any suspended sediment, and further improve the color and clarity. The natural color of the resulting oil when properly prepared being amber, very little filtering is required.

The oil resulting from the foregoing treatment has the following desirable and interesting characteristics:

Although the stock of raw material from which the unsaturated hydrocarbons were obtained may have been obtained from paraffin base oils, such as distillate from Pennsylvania crude, the oil does not have the usual properties of paraffin base lubricating oils, but has the properties of lubricating oils made from the finest asphaltic base crudes. The oil may be reduced so as to have a very high viscosity and at the same time has a low specific gravity and a very low cold test. Thus, this very viscous oil will pour freely at a temperature below —20° F. and at that temperature or even lower will remain perfectly bright, that is to say, it shows no separation of solid matter.

When distilled under a vacuum, 60% of this oil distils within the range of 70° C. showing that it is much more uniform in composition than usual or ordinary oils.

What I claim is:—

1. The process of manufacturing lubricating oil of low specific gravity, low cold test, and high viscosity from light hydrocarbons of petroleum distillates consisting in agitating a suitable petroleum distillate in the presence of a catalyst, separating undesirable matter therefrom, and reducing the product.

2. The process of manufacturing lubricating oil of low specific gravity, low cold test, and high viscosity from light hydrocarbons of petroleum distillates derived from paraffin base crudes consisting in agitating a suitable petroleum distillate in the presence of a catalyst, separating undesirable matter therefrom, and reducing the product.

3. The process of manufacturing lubricating oil of low specific gravity, low cold test, and high viscosity from light hydrocarbons of petroleum distillates consisting in heating and agitating a suitable petroleum distillate in the presence of a catalyst, separating undesirable matter therefrom, and reducing the product.

4. The process of manufacturing lubricating oil of low specific gravity, low cold test, and high viscosity from light hydrocarbons of petroleum distillates derived from paraffin base crudes consisting in heating and agitating a suitable petroleum distillate in the presence of a catalyst, separating undesirable matter therefrom, and reducing the product.

5. The process of manufacturing lubricating oil of low specific gravity, low cold test, and high viscosity from light hydrocarbons of petroleum distillates consisting in agitating a suitable petroleum distillate in the presence of a catalyst, separating undesirable matter therefrom, and subjecting the product to a reducing action in the presence of a suitable gas.

6. The process of manufacturing lubricating oil from light hydrocarbons of petroleum distillates consisting in agitating the same within an inclosed vessel in the presence of a suitable catalyst and temperature to effect reaction and separation of useful vapors from undesirable products, removing accumulated refuse matter, agitating and washing the product, treating it with alkaline material and then removing the same and reducing the remaining product.

7. The process of manufacturing lubricating oil from light hydrocarbons of petroleum distillates consisting in agitating the same within an inclosed vessel in the presence of a suitable catalyst and temperature to effect reaction and separation of useful vapors from undesirable products, removing accumulated refuse matter, agitating and washing the product, treating it with alkaline material and then removing the same, and subjecting the remaining product to reducing action in the presence of steam.

8. The process of manufacturing lubricating oil from light hydrocarbons of petroleum distillates consisting in agitating the same within an inclosed vessel in the presence of a suitable catalyst and temperature to effect reaction and separation of useful vapors from undesirable products, removing accumulated refuse matter, distilling off, condensing and washing a portion of the lighter vapors, agitating and washing the remaining product, treating it with alkaline material and then removing the same, and reducing the remaining product.

9. The process of manufacturing lubricating oil from light hydrocarbons of petroleum distillates consisting in agitating the same within an inclosed vessel in the presence of a suitable catalyst and temperature to effect reaction and separation of useful vapors from undesirable products, removing accumulated refuse matter, distilling off condensing and washing a portion of the lighter vapors, agitating and washing the remaining product, treating it with alkaline material and then removing the same, and subjecting the remaining product to reducing action in the presence of steam.

10. In the manufacture of lubricating oils, the herein described process consisting in subjecting a suitable light hydrocarbon distillate within an inclosed vessel to heating and agitating action in the presence of a catalyst to effect reaction and separation of useful vapors, withdrawing accumulated sludge, distilling off a portion of lighter vapors and washing and condensing the same, further agitating and washing the remaining product and allowing it to settle, washing the product with alkaline material, washing and removing the alkaline material, and then subjecting the remaining product to reducing action in the presence of steam to separate lubricating oil products.

11. In the manufacture of lubricating oils, the herein described process consisting in subjecting a suitable light hydrocarbon distillate to sulfuric acid treatment, and then within an inclosed vessel to heating and agitating action in the presence of a catalyst to effect reaction and separation of useful vapors, withdrawing accumulated sludge, distilling off a portion of lighter vapors and washing and condensing the same, further agitating and washing the remaining product and allowing it to settle, washing the product with alkaline material, washing and removing the alkaline material, and then subjecting the remaining product to reducing action in the presence of steam to separate lubricating oil products.

12. The process of manufacturing lubricating oil consisting in subjecting a suitable hydrocarbon distillate to pyrogenous treatment to produce unsaturated light hydrocarbons, and then treating the same with a catalyst capable of accelerating polymerization of said products to form lubricating oil, and then separating the oil by means of heat.

In testimony whereof I hereunto affix my signature.

ROY H. BROWNLEE.